US008244233B2

United States Patent
Chang et al.

(10) Patent No.: US 8,244,233 B2
(45) Date of Patent: Aug. 14, 2012

(54) SYSTEMS AND METHODS FOR OPERATING A VIRTUAL WHITEBOARD USING A MOBILE PHONE DEVICE

(75) Inventors: Tung Chang, Saratoga, CA (US); Aki Shohara, Sunnyvale, CA (US)

(73) Assignee: Augusta Technology, Inc., Santa Clara, CA (US)

( * ) Notice: Subject to any disclaimer, the term of this patent is extended or adjusted under 35 U.S.C. 154(b) by 136 days.

(21) Appl. No.: 12/759,691

(22) Filed: Apr. 13, 2010

(65) Prior Publication Data

US 2010/0261466 A1    Oct. 14, 2010

Related U.S. Application Data

(63) Continuation of application No. 12/711,224, filed on Feb. 23, 2010.

(60) Provisional application No. 61/168,927, filed on Apr. 13, 2009.

(51) Int. Cl.
*H04M 3/00*    (2006.01)

(52) U.S. Cl. ........ 455/420; 455/418; 455/419; 715/781; 715/863

(58) Field of Classification Search .................. 455/420, 455/419, 418; 715/781, 863; 709/217, 204; 713/171, 186
See application file for complete search history.

(56) References Cited

U.S. PATENT DOCUMENTS

| | | | |
|---|---|---|---|
| 2004/0236830 A1* | 11/2004 | Nelson et al. | 709/204 |
| 2005/0280636 A1* | 12/2005 | Hildebrandt et al. | 345/173 |
| 2007/0174416 A1* | 7/2007 | Waters et al. | 709/217 |
| 2008/0072139 A1* | 3/2008 | Salinas et al. | 715/238 |
| 2008/0247141 A1* | 10/2008 | Kendall et al. | 361/729 |
| 2009/0287928 A1* | 11/2009 | Braun | 713/171 |

* cited by examiner

*Primary Examiner* — Nick Corsaro
*Assistant Examiner* — Chuong A Ngo
(74) *Attorney, Agent, or Firm* — Venture Pacific Law, PC

(57) ABSTRACT

A method for operating a virtual whiteboard using a mobile phone device, comprises the steps of: generating the virtual whiteboard, wherein the mobile phone device is coupled to the virtual whiteboard to input data to the virtual whiteboard; connecting the mobile phone device to an external display device; displaying the virtual whiteboard on the external display device; and operating the virtual whiteboard using the mobile phone device; wherein markings on the virtual whiteboard correspond to spatial movements of the mobile phone device.

17 Claims, 8 Drawing Sheets

SYSTEMS AND METHODS FOR OPERATING A VIRTUAL WHITEBOARD USING A MOBILE PHONE DEVICE

CROSS REFERENCE

This application claims priority from a provisional patent application entitled "Electronic Virtual Whiteboard" filed on Apr. 13, 2009 and having an Application No. 61/168,927 and from a nonprovisional patent application entitled "Systems and Methods for Driving an External Display Device Using a Mobile Phone Device" filed on Feb. 23, 2010 and having an application Ser. No. 12/711,224. Said applications are incorporated herein by reference.

FIELD OF INVENTION

This invention relates to systems and methods for operating a virtual whiteboard, and, in particular, to systems and methods for operating a virtual whiteboard by using a mobile phone device to input data and to display the virtual whiteboard.

BACKGROUND

For many centuries, freeform writing of images and text onto surfaces has been an invaluable medium for conveying ideas and thoughts to others. The writing surfaces have evolved from cave walls to blackboards in the last two centuries, and more recently, to whiteboards. The respective writing tools have evolved as well from stone chisels for cave writings, to chalk for blackboards, to dry erase pens for whiteboards, and so forth. With the advent of blackboards and whiteboards, the ease of selective erasure of images and text has greatly enhanced interactive communications and collaboration.

In the modern electronic age, whiteboards continue to play a significant role in interactive communications of ideas and thoughts because of its ease of usage and versatility in conveying ideas via freeform images and text on the whiteboard. As a testament to its utility and versatility, whiteboards and blackboards remain a fixture in virtually every classroom. Furthermore, whiteboard usage flourishes today in the modern electronic age despite the widespread availability of personal computers to convey the same ideas. The staying power of whiteboards is largely attributable to the simplicity and support for spontaneity in interactive communications and sharing of ideas with others.

In an effort to combine whiteboards with personal computers, electronic whiteboards were created for meetings or brainstorming sessions to record issues that are discussed at the meetings or sessions. Electronic whiteboards are also used in teleconferencing facilities so that issues raised in the teleconference can be recorded or can be better communicated through images drawn on the whiteboard.

FIG. 1 illustrates a prior art system for operating an electronic whiteboard. Generally, images are recorded on an electronic whiteboard 100 by an associated pen device 106 which is moved over the surface of the electronic whiteboard 100. The location of the pen device 106 is sensed by the electronic whiteboard 100 and the electronic whiteboard 100 responds by marking the parts of its surface over which the pen device 106 travels. In this way, markings (e.g., writings or drawings) made by a user of the pen device 106 on the surface of the electronic whiteboard 100 are recorded by the electronic whiteboard 100. Furthermore, computers 102 and 104 can view and generate markings on the electronic whiteboard 100 from remote locations via the Internet.

Although such prior art collaborative programs are extremely useful, existing collaborative facilities utilizing electronic whiteboards can require specialized communications hardware which impair widespread use and are essentially immobile, making it difficult for a mobile user to operate or view the electronic whiteboard. Thus, users without the necessary hardware are not able to participate in marking the electronic whiteboard.

Furthermore, electronic whiteboards are relatively expensive, complex, and cumbersome from a user's viewpoint for the kinds of interactive and spontaneous communications handled effectively by conventional whiteboards.

Therefore, there exists a need for new and improved methods for operating a virtual whiteboard, which can reduce expense and complexity, while improving convenience and ease of use.

SUMMARY OF INVENTION

An object of this invention is to provide methods for operating a virtual whiteboard using a mobile phone device, where the spatial location of the mobile phone device is tracked to generate corresponding user input to the virtual whiteboard.

Another object of this invention is to provide methods for remote viewing and remote operation of a virtual whiteboard using a mobile phone device.

Yet another object of this invention is to provide methods for generating markings on a virtual whiteboard using a mobile phone device, where the simplicity and utility of using a traditional whiteboard are retained while substantially extending its interactive power by electronic means.

Briefly, the present invention relates to a method for operating a virtual whiteboard using a mobile phone device, comprising the steps of: generating the virtual whiteboard, wherein the mobile phone device is coupled to the virtual whiteboard to input data to the virtual whiteboard; connecting the mobile phone device to an external display device; displaying the virtual whiteboard on the external display device; and operating the virtual whiteboard using the mobile phone device; wherein markings on the virtual whiteboard correspond to spatial movements of the mobile phone device.

An advantage of this invention is that the methods are provided for operating a virtual whiteboard using a mobile phone device, where the spatial location of the mobile phone device is tracked to generate corresponding user input to the virtual whiteboard.

Another advantage of this invention is that methods are provided for remote viewing and remote operation of a virtual whiteboard using a mobile phone device.

Yet another advantage of this invention is that methods are provided for generating markings on a virtual whiteboard using a mobile phone device, where the simplicity and utility of using a traditional whiteboard are retained while substantially extending its interactive power by electronic means.

DESCRIPTION OF THE DRAWINGS

The foregoing and other objects, aspects, and advantages of the invention will be better understood from the following detailed description of the preferred embodiment of the invention when taken in conjunction with the accompanying drawings in which.

DETAILED DESCRIPTION OF THE PREFERRED EMBODIMENTS

A mobile phone device can be used to operate a virtual whiteboard. The mobile phone device can be connected via a wired connection or a wireless connection to an external display device for displaying the virtual whiteboard. The external display device can include a projector screen, a VGA monitor, a liquid crystal display ("LCD"), or other display device. The mobile phone device can be configured to display a portion of the virtual whiteboard on the mobile phone device and the entire (or substantial portion of the) virtual whiteboard on the external display, thus providing for a unique virtual whiteboard experience. The virtual whiteboard can be further shared in a collaborative setting with additional users connected to the virtual whiteboard via a network from the users' respective computers, mobile phone device, and/or other computing devices. Also, the virtual whiteboard images can be saved for later retrieval and erasures on the virtual whiteboard can be undone.

The virtual whiteboard can be hosted by a mobile phone device. Since the mobile phone device can be carried in a user's pocket, convenience and mobility is greatly maximized. Thus, the virtual whiteboard can provide for a virtual whiteboard whenever necessary since it can host the virtual whiteboard and connect to an external display device for displaying the virtual whiteboard. The mobile phone device can be implemented by a mobile phone apparatus as described in copending U.S. nonprovisional patent application having Ser. No. 12/711,224 and filed on Feb. 23, 2010. However, it is understood that any computing device which can drive an external display device can be used for the purposes of this invention.

Figure 1:
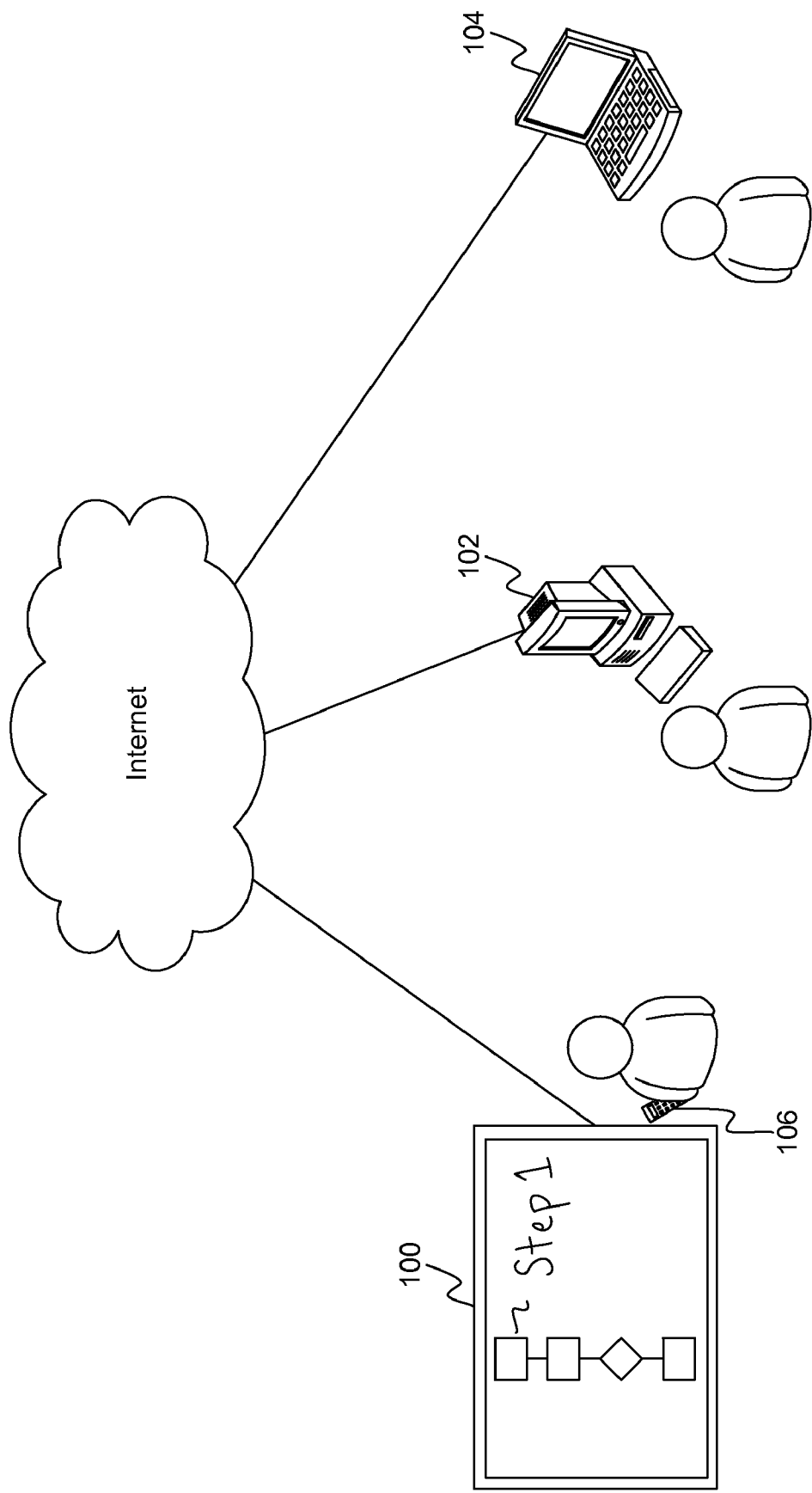
FIG. 1 illustrates a prior art system for operating an electronic whiteboard in a collaborative meeting.
Figure 2:
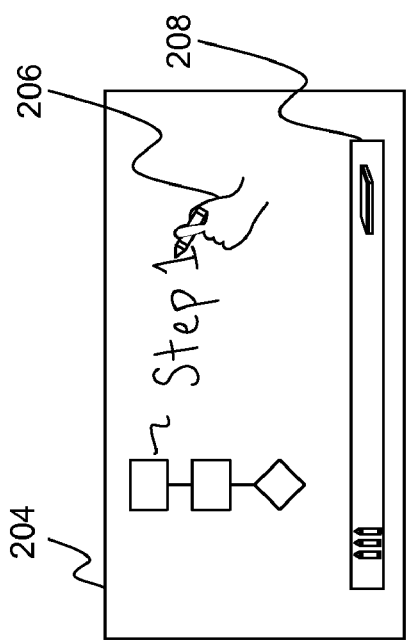
FIG. 2 illustrates a mobile phone device connected to a projector screen for operating a virtual whiteboard of the present invention.
Figure 2:
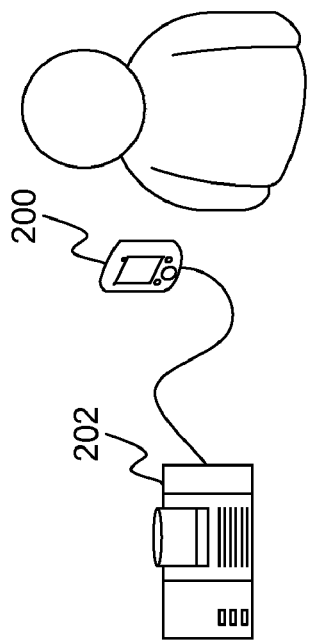
Figure 2:
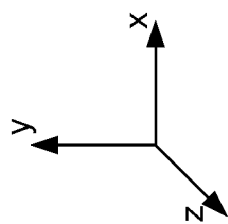

FIG. 2 illustrates a mobile phone device connected to a projector screen for operating a virtual whiteboard of the present invention. A mobile phone device 200 can host and generate a virtual whiteboard 204 for interactive communications and collaboration using a projector 202 to display the virtual whiteboard 204. The user can make markings on the virtual whiteboard 204 by inputting user data to the mobile phone device 200. The markings on the virtual whiteboard 204 can be made by maneuvering the mobile phone device 200 in space to mimic writing on traditional whiteboards. Thus, the power and simplicity of traditional whiteboards to convey ideas can be preserved by using a mobile phone device to generate the virtual whiteboard and operate the virtual whiteboard in a familiar manner.

The mobile phone device 200 comprises a sensor for sensing the spatial movements of the mobile phone device 200 in space. Three axes, e.g., an x-axis, a y-axis and a z-axis, can be defined to measure such movements of the mobile phone device 200. The sensor can be implemented by a three dimensional accelerometer and/or, possibly, a three dimensional gyroscope for detecting the spatial movement of the mobile phone device 200. As the mobile phone device 200 is moved in space, a cursor 206 on the virtual whiteboard 204 can be positioned to correspond with the detected x-axis, y-axis, and z-axis components of the spatial movement of the mobile phone device 200 or the angular motion of the mobile phone device 200.

In addition, various user modes can be selected by the user for providing various user inputs to the virtual whiteboard. For instance, in one embodiment of the present invention, there can be three modes, including a writing mode, an erasing mode, and an idle mode. The writing mode allows the user to generate markings on the virtual whiteboard. In this mode, the cursor 206 can be a hand icon holding a marker to indicate to the user that the current mode is in the writing mode. The erasing mode allows the user to remove markings on the virtual whiteboard. The cursor can be a hand icon holding an eraser (not shown) to indicate to the user that the current mode is in the erasing mode. The idle mode allows the user to navigate the virtual whiteboard without making markings or removing markings The cursor can be an empty hand (not shown) with the index finger positioned to point a selected location.

During the idle mode, the cursor can point to locations of interest on the virtual whiteboard, similarly to using a conventional whiteboard in a lecture hall setting when the lecturer points to a particular portion of the conventional whiteboard. In other uses, the cursor can grab and rearrange various areas within a single virtual whiteboard or cycle through multiple virtual whiteboards.

Intuitive graphical means can be used to switch between the three modes. In an embodiment on the present invention, the idle mode is the initial mode when the virtual whiteboard is generated. The virtual whiteboard may have a plurality of pen icons and an eraser displayed in a tools tray 208 of the virtual whiteboard 204.

When the cursor 206 is moved to the tools tray according to the spatial motion of the mobile phone device 200, the writing mode can be activated by touching the cursor 206 with the pen icons of the tools tray 208 (i.e., where touching can mean that the location of the cursor 206 intersects with the location of the pen icons of the tools tray 208). The pen icons of the tools tray 208 can comprise various colored pens to choose from for marking the virtual whiteboard. When the cursor 206 retouches the pen icons of the tools tray 208, the idle mode can be reactivated. Similarly, during the idle mode, when the cursor 206 touches the eraser icon of the tools tray 208, the erasing mode can be activated. When the cursor 206 retouches the eraser icon of the tools tray 208, the idle mode is reactivated. Thus, the intuitive and graphically oriented mode switching method facilitates learning and remembering of virtual whiteboard control procedures.

The display of the virtual whiteboard 204 can be a white background on which colored markings are rendered onto the white background. The markings can be generated by a user interface ("UI") on the mobile phone device 200. A drawing engine can be used to render the virtual whiteboard 204 to be displayed on the external display device (i.e., the projector 202).

The mobile phone device 200 can buffer and display the virtual whiteboard 204, where a video frame of graphical data representing the current virtual whiteboard can be buffered and outputted in successive buffered images to the external display device in real time as the buffered whiteboard contents are updated.

The UI of the mobile phone device 200 can convey user input to the virtual whiteboard and operate the virtual whiteboard. If the mobile phone device 200 has a touchscreen, the UI can be responsive to motion over the touchscreen by an object, e.g., a user's finger or stylus. Furthermore, user input can be a combination or a single one of the following: pressing a soft switch or control icon on the touchscreen that is displaying the UI, finger gestures along the touchscreen, spatial movements of the mobile phone device 200, or pressing physical buttons located on the mobile phone device 200.

The writing mode can be implemented by a drawing program, where freeform line drawings or other graphics can be inputted onto the touchscreen display with a stylus, a finger, or other object. The line width of the markings can be programmable and adjusted. The line drawings can be drawn onto the touchscreen of the mobile phone device 200 to generate corresponding markings on the virtual whiteboard 204. Furthermore, other markings can be inputted to the virtual whiteboard 204 by entry of text characters via an onscreen keyboard or via physical keyboard buttons on the mobile phone device 200.

The UI may also provide zooming and scrolling views of the virtual whiteboard. Conventional onscreen soft control icons, physical buttons on the mobile phone device 200, or gestures on the touchscreen of the mobile phone device 200 can be used to zoom in and scroll across the display of the virtual whiteboard 204 by the projector 202 or on the screen of the mobile phone device 200.

A drawing program can maintain and update the virtual whiteboard by buffering the image data of the virtual whiteboard. A contiguous area of the buffered virtual whiteboard can be displayed onto the UI display on the mobile phone device 200, where the UI display sector size and location within the whiteboard image is responsive to the user's zoom and horizontal/vertical scroll control commands via the UI.

Additionally, the buffered image of the virtual whiteboard can be encoded to be externally displayed so that the virtual whiteboard can be displayed on a larger external display device. The display sector size and position relative to the virtual whiteboard can vary according to the user's defined zoom and horizontal/vertical scroll control settings. The user can thereby utilize both the touchscreen of the mobile phone device and the external display device for viewing of the virtual whiteboard. The user may use the touchscreen to navigate to various areas within the virtual whiteboard for receiving user input, while viewing the entire (or substantial portion of the) virtual whiteboard on the external display device.

The virtual whiteboard image can be updated to indicate current line drawings (e.g., markings on the virtual whiteboard) in real time, and thus responsively generate those line drawings onto the virtual whiteboard image to be displayed to the user. The buffered pixels corresponding to the line drawing can be color encoded for sharp contrast with the background color of the virtual whiteboard. Furthermore, different users of the virtual whiteboard may also use different color markings to distinguish between each others' markings on the virtual whiteboard.

The markings on the virtual whiteboard can be erased in various ways. For instance, in one method, the pixel color of a marking can be set to match the background color of the virtual whiteboard. In another method, an entire area of the whiteboard image can be erased. Furthermore, within a selected area, a swath of virtual area is selected to be erased, where the size of the swath can be adjusted and predefined.

Figure 3:
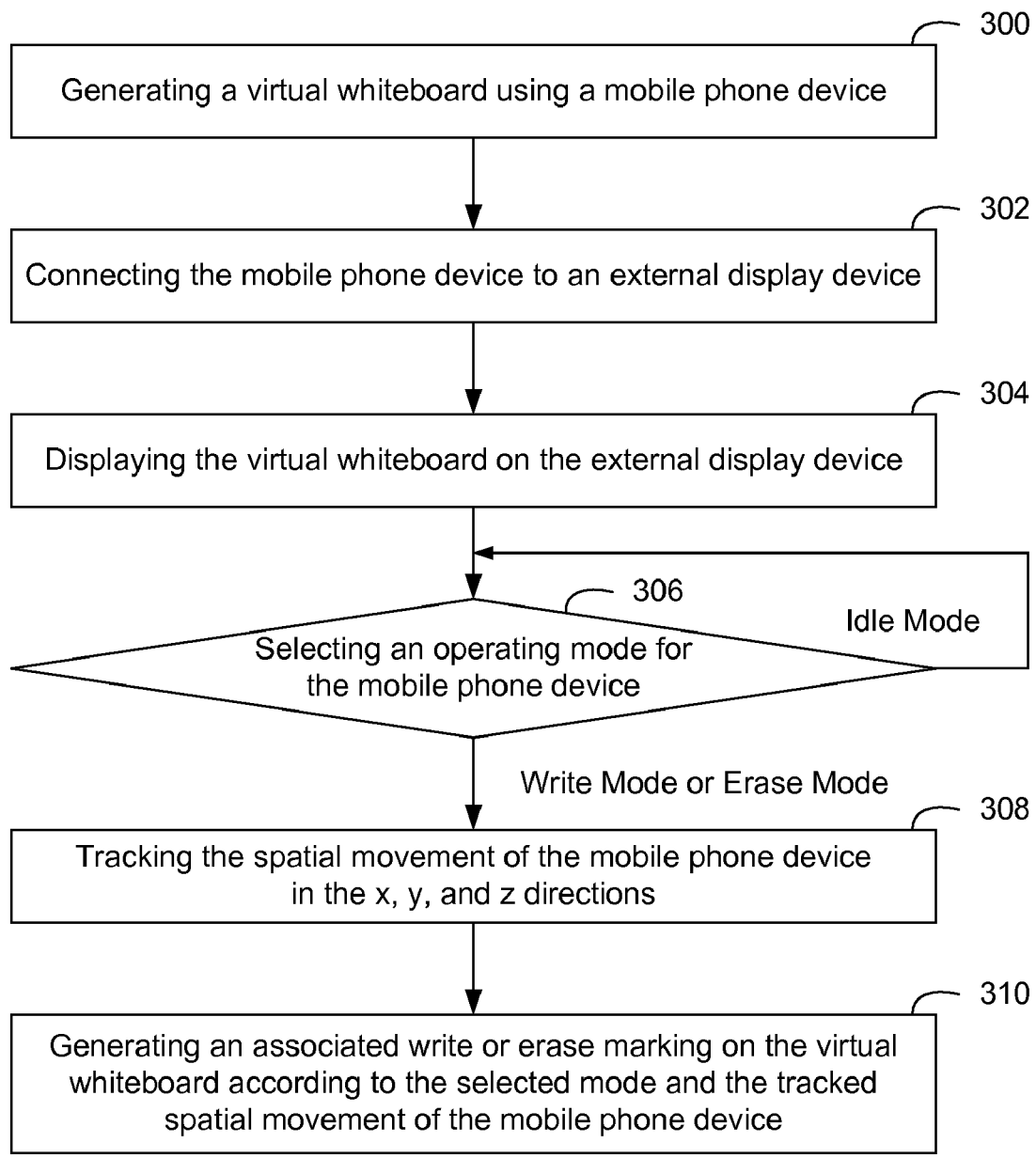
FIG. 3 illustrates a flow chart for a method of the present invention for operating a virtual whiteboard using a mobile phone device.

FIG. 3 illustrates a flow chart for a method of the present invention for operating a virtual whiteboard using a mobile phone device. A virtual whiteboard can be generated using a mobile phone device 300. The virtual whiteboard program can be an application running on the mobile phone device or on a server connected to the mobile phone device via a network. The mobile phone device can be further connected to an external display device 302, where the external display device can display the virtual whiteboard 304. Next, an operating mode is selected by the user 306. The system can operate in the idle mode until the user selects either the writing mode or the erasing mode. Once the writing mode or erasing mode is selected, then the spatial movement of the mobile phone device may be tracked (e.g., along the x-, y-, and z-axes) 308. The tracked spatial movement is used to generate a corresponding write or erase marking on the virtual whiteboard according to the selected mode 310.

Figure 4:
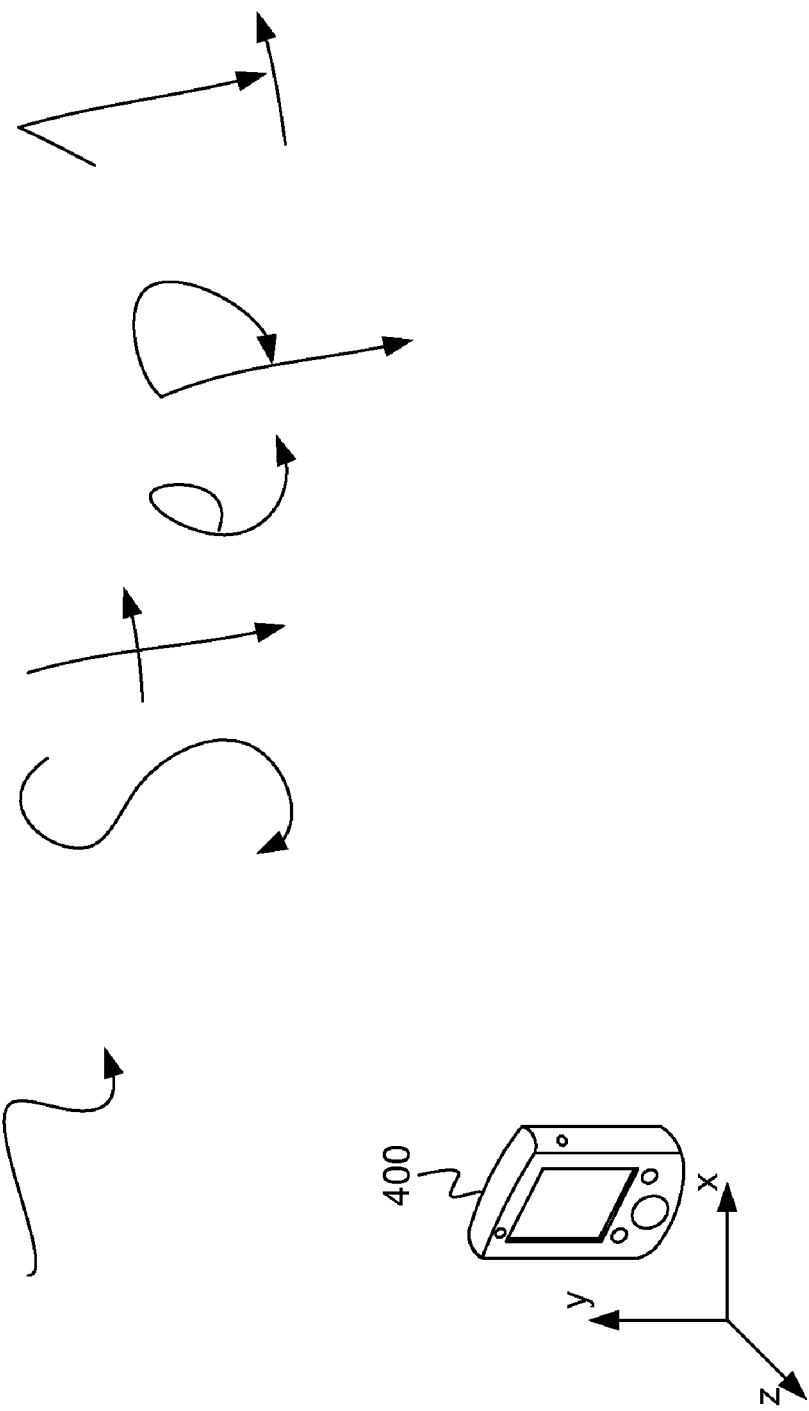
FIG. 4 illustrates a method of the present invention for marking a virtual whiteboard using a mobile phone device.

FIG. 4 illustrates a method of the present invention for marking a virtual whiteboard using a mobile phone device. A mobile phone device 400 can be used to input markings on the virtual whiteboard by using the mobile phone device 400 as a virtual pen and writing the markings in space. The spatial movements of the mobile phone device 400 are tracked and translated to corresponding markings on the virtual whiteboard. For instance, the mobile phone device 400 can be spatially moved in the x and y coordinates from left to right to form the text "-Step 1". Each character can comprise one or more strokes of the mobile phone device 400. Furthermore, the direction of the strokes is illustrated to aid in the understanding of this invention.

In the writing mode, the virtual whiteboard can have a pen icon to indicate the current position of where the writing appears and when the writing function is engaged by the user. The pen icon can have a well defined pen point for writing on the virtual whiteboard. The pen point of the pen icon can also leave a trail on the virtual whiteboard to indicate the current marking, so that the user can visually see which portions are being marked when the write function is engaged. A write signal can be used to convey to the virtual whiteboard to begin writing. When the write signal is off, the respective marking is stopped.

The write signal can be inputted to the mobile phone device 400 in various manners. A write button on the mobile phone device 400 (e.g., a touchscreen button or a physical button) can be pressed to generate the write signal to the UI. Thus, when the user's finger presses the write button, the write signal is on; and when the user's finger is not pressing the write button, then the write signal is off. The pressing and lifting of the write button can be very intuitive since the forward and down motion of the finger on the mobile phone device 400 to press the write button can mimic the motion of writing on conventional whiteboards using a pen. Therefore, learning and remembering how to mark the virtual whiteboard using the mobile phone device 400 as the writing instrument can be substantially made more intuitive and easier.

Visual feedback can be used to cue the user that the write signal is on, thus signifying that the pen icon is currently marking the virtual whiteboard. For instance, the pen icon can be displayed in a different color or more vibrant color. Alternatively, the tip of the pen icon may light up, change in color, and/or change in shading. Furthermore, the user can utilize visual feedback from the display of the virtual whiteboard on the external display to effectively view the movement of the pen icon to achieve a desired writing on the virtual whiteboard.

Figure 5:
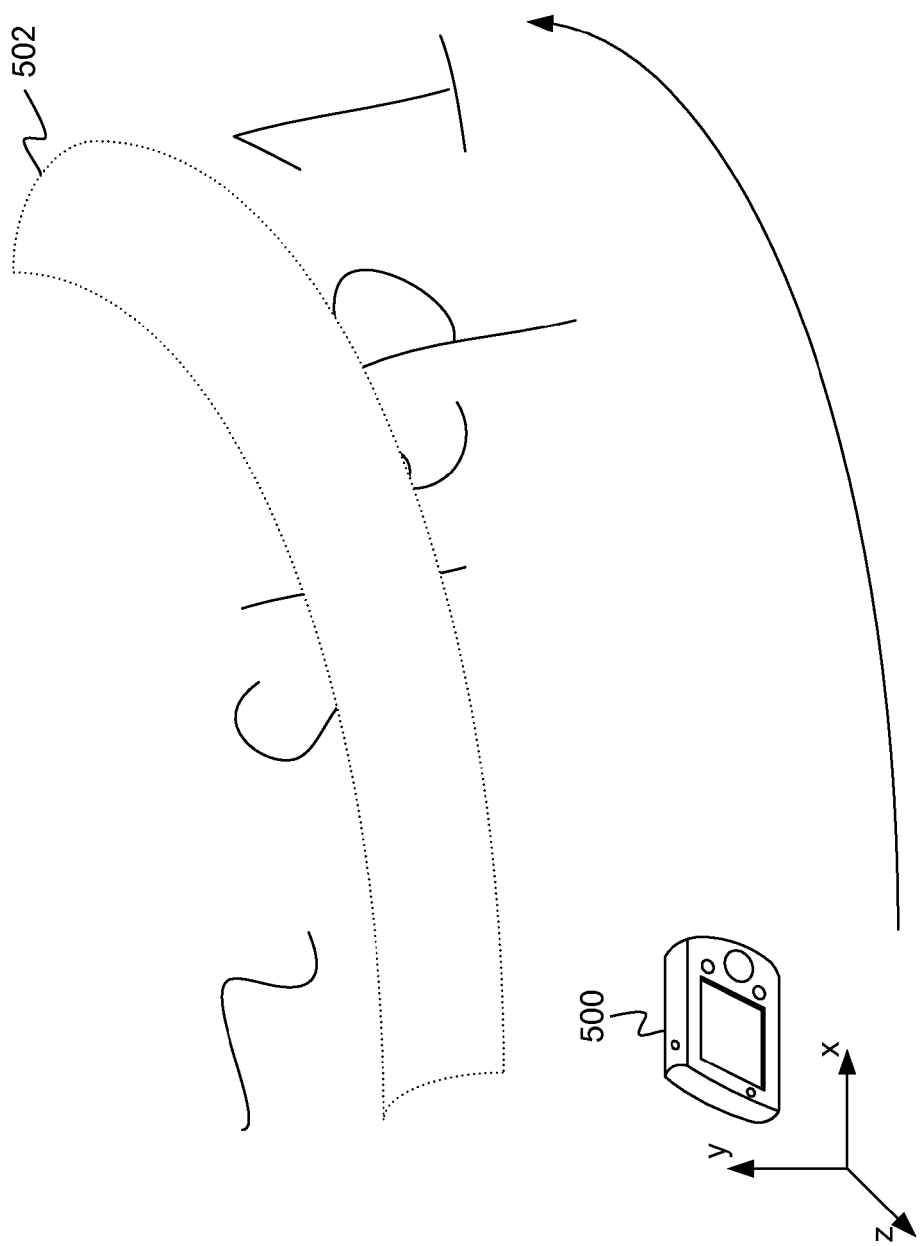
FIG. 5 illustrates a method of the present invention for erasing markings on a virtual whiteboard using a mobile phone device.

FIG. 5 illustrates a method of the present invention for erasing markings on a virtual whiteboard using a mobile phone device. A mobile phone device 500 can be used to remove markings on the virtual whiteboard by moving the mobile phone device 500 in space as a virtual eraser. The spatial movements of the mobile phone device 500 are tracked and translated to corresponding erasures on the virtual whiteboard. For instance, the mobile phone device 400 can be spatially moved in the x and y coordinates from left to right in an upward motion to erase part of the text "-Step 1", as illustrated by an erasure stroke 502. Note that the border of this erasure stroke 502 is illustrated to aid in the understanding of this invention. However, the virtual whiteboard may not display the border of the erasure stroke.

In the erasing mode, the virtual whiteboard can have an erasure icon to indicate that the erasing mode is activated. Furthermore, the erasure icon can have an erasing edge for erasing any markings on the virtual whiteboard which the erasing edge touches. The erasing edge's orientation can correspond to an edge of the mobile phone device 500. For instance, the mobile phone device's 500 bottom edge can represent the erasing edge on the erasure icon. Thus, when the orientation of the mobile phone device 500 is changed, that change is reflected on the edge of the erasure. In addition, the width of the edge of the erasure can also be adjusted.

In the erasing mode, when an erase signal is on, the markings on the virtual whiteboard which are swept by the erasing edge are removed. An erasing signal can be turned on by pressing an erase button on the mobile phone device 500. For instance, the mobile phone device may have a physical button placed on its side for turning on the erasing signal.

The user achieves desired erasure of a portion of the virtual whiteboard by pressing the erase button on the mobile phone device 500 and moving the eraser's edge to sweep across a section of the virtual whiteboard to be removed.

The user can be provided visual feedback that the erase signal is engaged. For instance, a visual cue can be given, such as lighting up the erasure, highlighting the eraser, changing the color of the erasure, changing the shading of the erasure, or lighting up or highlighting the erasing edge.

Figure 6:
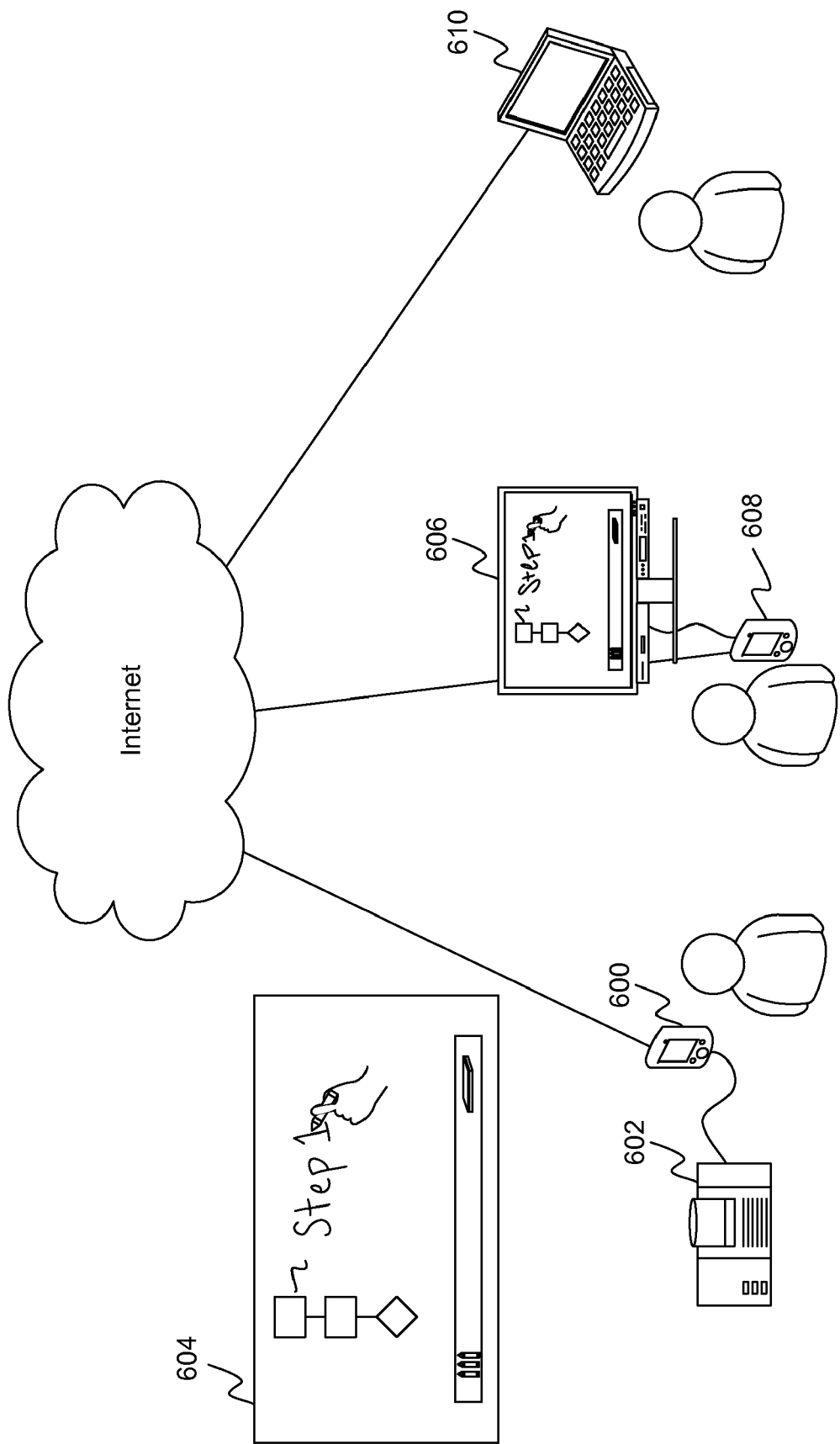
FIG. 6 illustrates a method of the present invention for remote operation of a virtual whiteboard using a mobile phone device to receive user input.

FIG. 6 illustrates a method of the present invention for remote operation of a virtual whiteboard using a mobile phone device to receive user input. The mobile phone device of the present invention can connect various other users to the virtual whiteboard for a collaborative meeting by connecting to other computing devices via a network (e.g., including a cellular network, a wired broadband network, a wireless broadband network, a telephone network, a satellite network, or other types of networks). A mobile phone device 600 can connect to a projector 602 for displaying a virtual whiteboard 604. The virtual whiteboard 604 can also be operated by other devices connected to the mobile phone device 600 via a network (e.g., the Internet). For instance, a second user using a mobile phone device 608 can connect to the mobile phone device 600 to view and/or operate the virtual whiteboard 604.

The mobile phone device 608 can also be further connected to a television 606 (or other external display device) to view the virtual whiteboard 604. Furthermore, additional devices (e.g., a computer 610) can be used to view and/or operate the virtual whiteboard 604. Since the mobile phone device 600, the mobile phone device 608, and the computer 610 are connected via the network, the users of these devices can be located in different locations. Thus, the users need not be co-located as with conventional whiteboards. Trivially, the users operating the devices 600, 608, and 610 can physically pass operation of their respective devices to another user who is thereby enabled to operate the virtual whiteboard.

In this way, remote collaboration among a group of users can be accomplished, where the group members can have functionally similar devices (or different devices) for operating the virtual whiteboard. Each group member is capable of writing to a single virtual whiteboard in the manner described above.

Furthermore, the virtual whiteboard can be a graphic file contained in each device connected to the virtual whiteboard. The various separate graphic files can be synchronized, such that the content on the virtual whiteboard is the same for all group members.

In an embodiment of the present invention, only one device is given access to write or modify the virtual whiteboard. Commonly used control access algorithms can be used to implement the sharing of the common graphic file. Additionally, in remote collaboration, a user can specify which device is allowed to access and operate the virtual whiteboard.

The virtual whiteboard can also be supported by a server to generate the virtual whiteboard software and house the processing resources for generating the virtual whiteboard. Furthermore, the server can send and receive data from the users of the virtual whiteboard via the network.

In yet another embodiment of the present invention, a virtual whiteboard can be presented at multiple remote locations from a presenter's location. The presenter can have a mobile phone device of the present invention and the remote locations can each have computing devices to connect to the presenter's mobile phone device. Furthermore, the virtual whiteboard can be displayed on external displays at each location and the presenter's location. In this way, the presenter can perform the presentation locally via his/her respective mobile phone device. The presentation is thus broadcasted to the remote locations. In addition, feed back from the remote locations can be inputted onto the virtual whiteboard via the respective computing devices of the remote locations.

Furthermore, at the remote locations, the drawing engine of the respective computing devices can enter a synchronization sub-mode to buffer the virtual whiteboard's contents. This technique for remote synchronization of data buffers is commonplace. Additionally, a one way data communication channel for each remote computing device can be established to synchronize the virtual whiteboard. Thus, the remote computing devices can have write access to the virtual whiteboard to contribute to the contents of the virtual whiteboard. A voice channel for each remote device can also be set up to provide an audio accompaniment to the virtual whiteboard presentation so that the users in the remote locations can communicate with each other. For instance, for mobile phone devices, cellular communications capabilities for a multicast channel can be used for data and audio channels to the remote locations.

Figure 7:
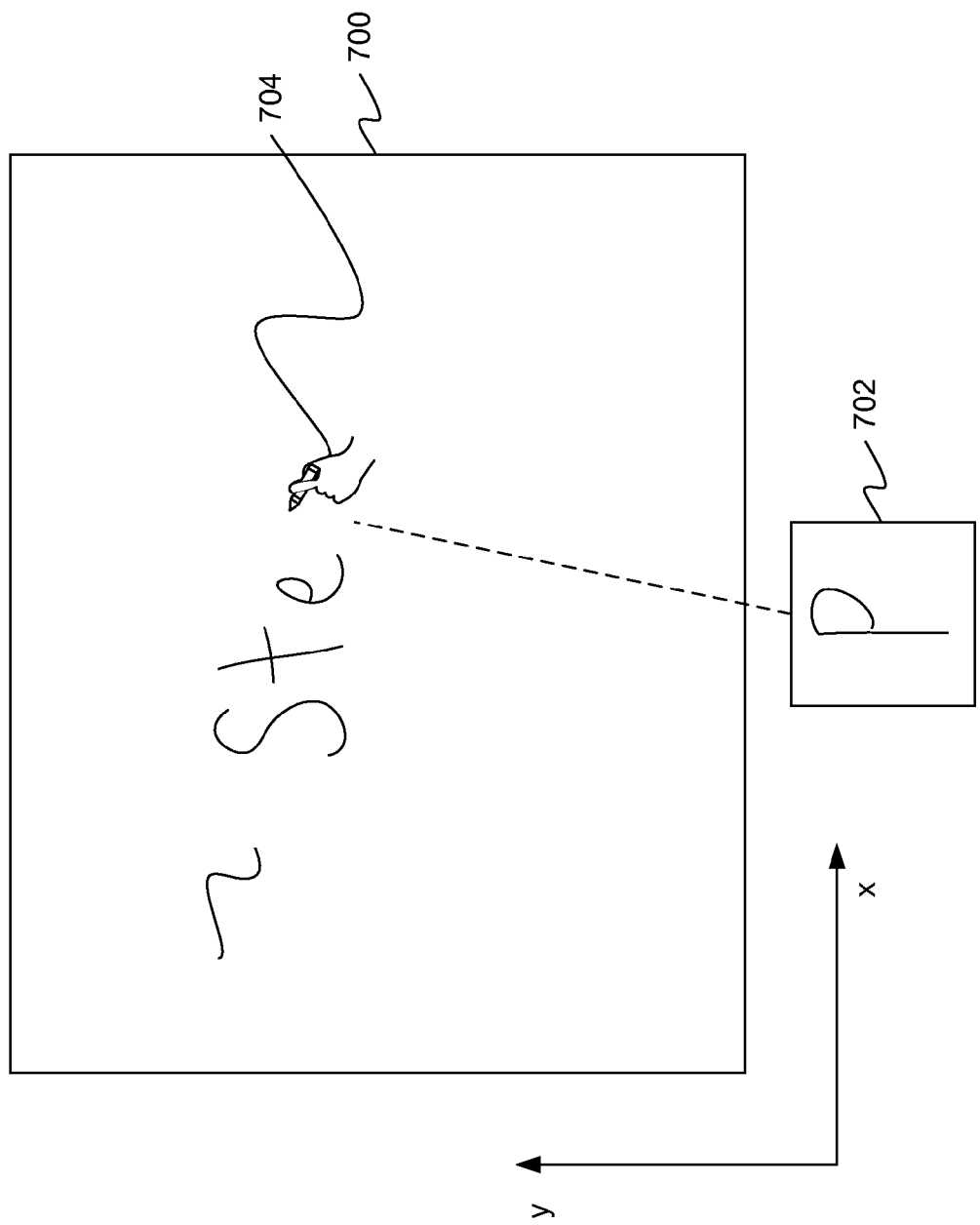
FIG. 7 illustrates a method of the present invention for inputting markings on a virtual whiteboard by writing on a touchscreen of a mobile phone device.

FIG. 7 illustrates a method of the present invention for inputting markings on a virtual whiteboard by writing on a touchscreen of a mobile phone device. A mobile phone device of the present invention may have an area 700 for displaying a virtual whiteboard and have a second area 702 for inputting markings onto the virtual whiteboard. Thus, the second area 702 can be a separate touch sensitive area on the mobile phone device or a portion of a touchscreen of the mobile phone device. The second area 702 can be written on with an object, e.g., a stylus, finger, or other object. The position of the object is detected and tracked as it moves on (or in proximity to) the second area 702. The tracked position of the object is translated to a corresponding marking on the virtual whiteboard.

For instance, if the object is used to write a "P" on the second area 702, then a similar marking resembling a "P" is marked on the virtual whiteboard.

Furthermore, the user can select a certain area of the virtual whiteboard to mark. After the area is selected, that area can be marked by writing on the second area 702. In the example above, where the user writes a "P" on the second area 702, that marking is detected and a corresponding "P" marking is placed on the virtual whiteboard at the selected area. A cursor 704 on the virtual whiteboard follows the motion of the object to make the "P" marking.

Furthermore, a next area to be marked on the virtual whiteboard can be automatically selected to be associated for receiving a marking In writing words on the virtual whiteboard, the next area of the virtual whiteboard can be shifted one character space at a time from left to right so that the user can continue writing the next character without having to manually select the next area on the virtual whiteboard to write a next character. For instance, after writing the "S" character marking, the area being written on is moved to the next area on the virtual whiteboard for receiving a marking The moving of the next area to be marked can be triggered due to one or more of the following conditions: a character is identified by the UI, a predefined amount of time has elapsed after a stroke, or other conditions are met.

Figure 8:
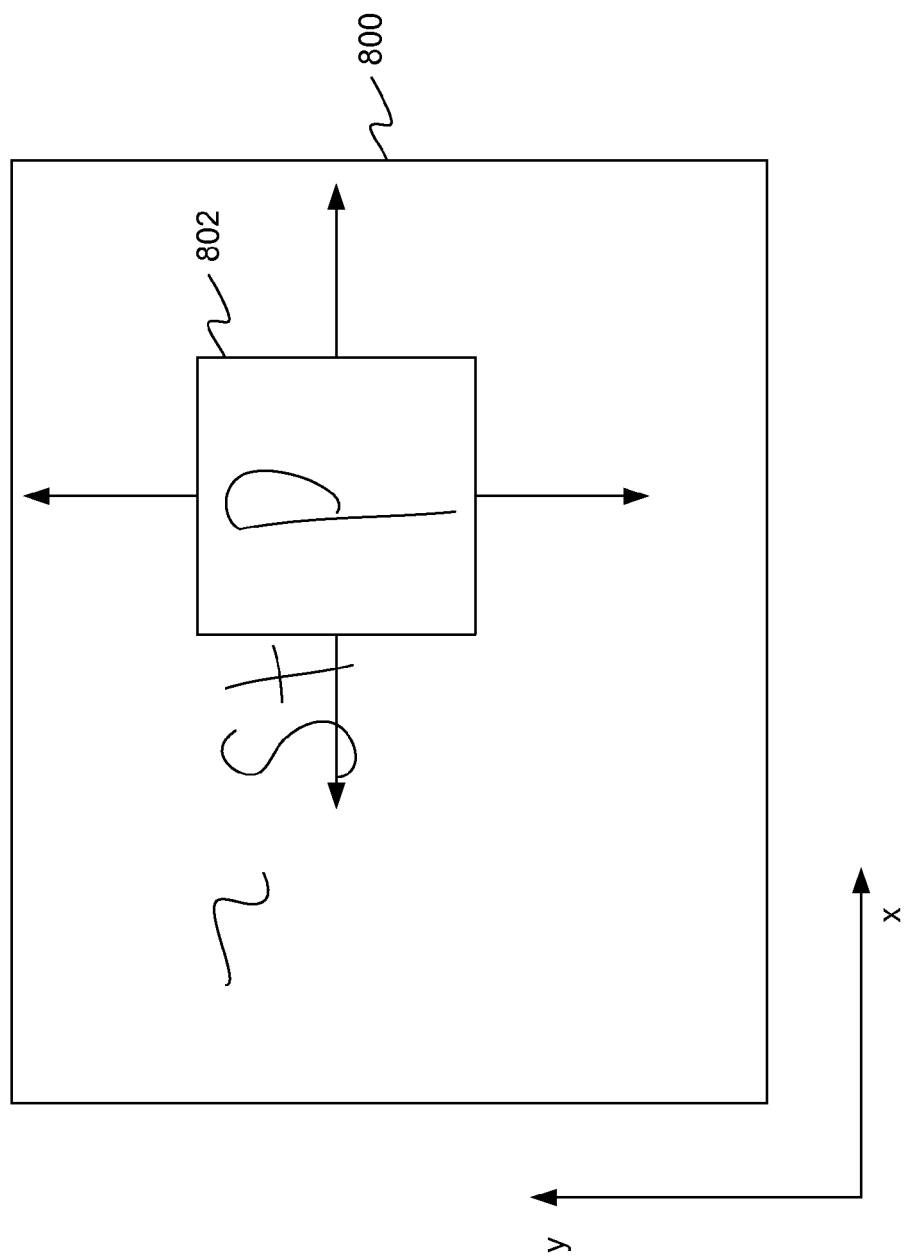
FIG. 8 illustrates yet another method of the present invention for inputting markings on a virtual whiteboard by writing on a touchscreen of a mobile phone device.

FIG. 8 illustrates yet another method of the present invention for inputting markings on a virtual whiteboard by writing on a touchscreen of a mobile phone device. A mobile phone device of the present invention may have an area 800 for displaying a virtual whiteboard and have a second area 802 for inputting markings onto the virtual whiteboard. Thus, the second area 802 can be displayed on top of the first area 800. The location of the second area 802 can be moved relative to the first area 800, such that the area over the first area 800 is zoomed in by the second area 802 and the area the second area 802 is covering is written to by the user input. Furthermore, the second area 702 can be written on with an object, e.g., a stylus of finger. The position of the object is detected and tracked as it moves on (or in proximity to) the second area 702. The tracked position of the object is translated to a corresponding marking on the virtual whiteboard. For instance, if the object is used to write a "P" on the second area, then a similar marking resembling a "P" is marked on the virtual whiteboard.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A method for operating a virtual whiteboard using a mobile phone device, comprising the steps of:
    generating the virtual whiteboard, wherein the mobile phone device is coupled to the virtual whiteboard to input data to the virtual whiteboard;
    connecting the mobile phone device to an external display device;
    displaying the virtual whiteboard on the external display device; and
    operating the virtual whiteboard using the mobile phone device;
    wherein markings on the virtual whiteboard correspond to spatial movements of the mobile phone device, wherein the operating step has three modes, an idle mode, a writing mode, and an erasing mode, wherein the virtual whiteboard having a virtual tray disposed thereon and the virtual tray having a plurality of writing instruments and an eraser, wherein upon activating the virtual whiteboard, the virtual whiteboard enters the idle mode, wherein the virtual whiteboard enters the writing mode upon the mobile phone device detecting the spatial movement of the mobile phone device being directed in reaching into the virtual tray for one of the writing instruments and activating it as a current writing instrument, wherein the virtual whiteboard enters the idle mode from the writing mode upon the mobile phone device detecting the spatial movement of the mobile phone device being directed in putting into the virtual tray the current writing instrument, wherein the virtual whiteboard enters the erasing mode upon the mobile phone device detecting the spatial movement of the mobile phone device being directed in reaching into the virtual tray for the eraser, and wherein the virtual whiteboard enters the idle mode from the erasing mode upon the mobile phone device detecting the spatial movement of the mobile phone device being directed in putting into the virtual tray the eraser.

2. The method of claim 1 wherein the mobile phone device has an accelerometer to track the spatial movements of the mobile phone device.

3. The method of claim 1 wherein a first mobile phone device and a second phone device operate said virtual whiteboard, wherein the first mobile phone device is connected to the external display device, and wherein the first mobile phone device communicates with said second mobile device, passes operating control to said second mobile device, and receives operating instructions from said second mobile phone device in operating said virtual whiteboard.

4. The method of claim 3 wherein the second mobile phone device designates a second display device for displaying said virtual whiteboard.

5. The method of claim 3 wherein the second mobile phone device passes operating control back to the first mobile phone device.

6. The method of claim 3 wherein the mobile phone devices communicate via cellular communication.

7. The method of claim 1 wherein the mobile phone device has a touchscreen, wherein a user interface ("UI") for operating the virtual whiteboard is displayed on the touchscreen, and wherein the UI receives user input by detecting gestures on the touchscreen.

8. The method of claim 7 wherein the UI displays a first window and a second window on the touchscreen, wherein the second window is positioned over the first window, wherein the first window is a display of the virtual whiteboard and the second window is a display of a zoomed in view of a selected area of the virtual whiteboard, and wherein the markings are written to the virtual whiteboard at the selected area by the detected gestures on the second window.

9. The method of claim 8 wherein the second window is adjusted to display a different zoomed in view of an area of the first window according to the gesture.

10. The method of claim 8 wherein the second window is adjusted automatically to a direction to receive a next gesture.

11. A method for operating a virtual whiteboard using a mobile phone device, comprising the steps of:
generating the virtual whiteboard, wherein the mobile phone device is coupled to the virtual whiteboard to input data to the virtual whiteboard;
connecting the mobile phone device to an external display device;
displaying the virtual whiteboard on the external display device; and
operating the virtual whiteboard using the mobile phone device;
wherein markings on the virtual whiteboard correspond to spatial movements of the mobile phone device,
wherein the mobile phone device has an accelerometer to track the spatial movements of the mobile phone device,
wherein the operating step has three modes, an idle mode, a writing mode, and an erasing mode, wherein the virtual whiteboard having a virtual tray disposed thereon and the virtual tray having a plurality of writing instruments and an eraser, wherein upon activating the virtual whiteboard, the virtual whiteboard enters the idle mode, wherein the virtual whiteboard enters the writing mode upon the mobile phone device detecting the spatial movement of the mobile phone device being directed in reaching into the virtual tray for one of the writing instruments and activating it as a current writing instrument, wherein the virtual whiteboard enters the idle mode from the writing mode upon the mobile phone device detecting the spatial movement of the mobile phone device being directed in putting into the virtual tray the current writing instrument, wherein the virtual whiteboard enters the erasing mode upon the mobile phone device detecting the spatial movement of the mobile phone device being directed in reaching into the virtual tray for the eraser, and wherein the virtual whiteboard enters the idle mode from the erasing mode upon the mobile phone device detecting the spatial movement of the mobile phone device being directed in putting into the virtual tray the eraser.

12. The method of claim 11 wherein a first mobile phone device and a second phone device operate said virtual whiteboard, wherein the first mobile phone device is connected to the external display device, and wherein the first mobile phone device communicates with said second mobile device, passes operating control to said second mobile device, and receives operating instructions from said second mobile phone device in operating said virtual whiteboard.

13. The method of claim 12 wherein the second mobile phone device designates a second display device for displaying said virtual whiteboard.

14. The method of claim 12 wherein the second mobile phone device passes operating control back to the first mobile phone device.

15. The method of claim 12 wherein the mobile phone devices communicate via cellular communication.

16. The method of claim 11 wherein the mobile phone device has a touchscreen, wherein a user interface ("UI") for operating the virtual whiteboard is displayed on the touchscreen, wherein the UI receives user input by detecting gestures on the touchscreen, wherein the UI displays a first window and a second window on the touchscreen, wherein the first window is a display of the virtual whiteboard and the second window is a display of a zoomed in view of a selected area of the virtual whiteboard, and wherein the markings are written to the virtual whiteboard at the selected area by the detected gestures on the second window.

17. A method for operating a virtual whiteboard using a mobile phone device, comprising the steps of:
generating the virtual whiteboard, wherein the mobile phone device is coupled to the virtual whiteboard to input data to the virtual whiteboard;
connecting the mobile phone device to an external display device;
displaying the virtual whiteboard on the external display device; and
operating the virtual whiteboard using the mobile phone device;
wherein markings on the virtual whiteboard correspond to spatial movements of the mobile phone device,
wherein the mobile phone device has an accelerometer to track the spatial movements of the mobile phone device,
wherein the operating step has three modes, an idle mode, a writing mode, and an erasing mode,
wherein the virtual whiteboard having a virtual tray disposed thereon and the virtual tray having a plurality of writing instruments and an eraser,
wherein upon activating the virtual whiteboard, the virtual whiteboard enters the idle mode,
wherein the virtual whiteboard enters the writing mode upon the mobile phone device detecting the spatial movement of the mobile phone device being directed in reaching into the virtual tray for one of the writing instruments and activating it as a current writing instrument,
wherein the virtual whiteboard enters the idle mode from the writing mode upon the mobile phone device detecting the spatial movement of the mobile phone device being directed in putting into the virtual tray the current writing instrument,
wherein the virtual whiteboard enters the erasing mode upon the mobile phone device detecting the spatial movement of the mobile phone device being directed in reaching into the virtual tray for the eraser,
wherein the virtual whiteboard enters the idle mode from the erasing mode upon the mobile phone device detecting the spatial movement of the mobile phone device being directed in putting into the virtual tray the eraser,
wherein a first mobile phone device and a second phone device operate said virtual whiteboard,
wherein the first mobile phone device is connected to the external display device,
wherein the first mobile phone device communicates with said second mobile device, passes operating control to said second mobile device, and receives operating instructions from said second mobile phone device in operating said virtual whiteboard,
wherein the second mobile phone device designates a second display device for displaying said virtual whiteboard,
wherein the second mobile phone device passes operating control back to the first mobile phone device,
wherein the mobile phone devices communicate via cellular communication,
wherein the mobile phone device has a touchscreen, wherein a user interface ("UI") for operating the virtual whiteboard is displayed on the touchscreen,
wherein the UI receives user input by detecting gestures on the touchscreen,
wherein the UI displays a first window and a second window on the touchscreen,
wherein the first window is a display of the virtual whiteboard and the second window is a display of a zoomed in view of a selected area of the virtual whiteboard, and
wherein the markings are written to the virtual whiteboard at the selected area by the detected gestures on the second window.

* * * * *